United States Patent
Saund et al.

(10) Patent No.: US 9,524,261 B2
(45) Date of Patent: Dec. 20, 2016

(54) CREDIT LOOKAHEAD MECHANISM

(71) Applicant: Apple Inc., Cupertino, CA (US)

(72) Inventors: Gurjeet S. Saund, Saratoga, CA (US); Harshavardhan Kaushikkar, San Jose, CA (US); Benjamin K. Dodge, San Jose, CA (US)

(73) Assignee: Apple Inc., Cupertino, CA (US)

( * ) Notice: Subject to any disclaimer, the term of this patent is extended or adjusted under 35 U.S.C. 154(b) by 404 days.

(21) Appl. No.: 13/724,955

(22) Filed: Dec. 21, 2012

(65) Prior Publication Data
US 2014/0181419 A1    Jun. 26, 2014

(51) Int. Cl.
| | | |
|---|---|---|
| G06F 13/00 | (2006.01) |
| G06F 3/00 | (2006.01) |
| G06F 13/38 | (2006.01) |
| G06F 13/28 | (2006.01) |
| H04L 12/801 | (2013.01) |

(52) U.S. Cl.
CPC ............ *G06F 13/385* (2013.01); *G06F 13/28* (2013.01); *H04L 47/10* (2013.01)

(58) Field of Classification Search
None
See application file for complete search history.

(56) References Cited

U.S. PATENT DOCUMENTS

| | | | |
|---|---|---|---|
| 5,832,245 A | 11/1998 | Gulick | |
| 6,192,028 B1 | 2/2001 | Simmons et al. | |
| 6,636,523 B1 | 10/2003 | Lau et al. | |
| 6,691,192 B2 * | 2/2004 | Ajanovic et al. | 710/107 |
| 7,020,141 B1 * | 3/2006 | Stacey et al. | 370/395.21 |
| 7,136,954 B2 | 11/2006 | Check et al. | |
| 7,224,691 B1 * | 5/2007 | Yeluri et al. | 370/394 |
| 7,256,719 B2 * | 8/2007 | Mitchell et al. | 341/67 |
| 7,464,174 B1 | 12/2008 | Ngai | |
| 7,698,478 B2 | 4/2010 | Wang et al. | |
| 7,840,737 B2 | 11/2010 | Tsunoda | |
| 8,045,472 B2 | 10/2011 | Wang et al. | |
| 2002/0004842 A1 * | 1/2002 | Ghose et al. | 709/235 |
| 2002/0075857 A1 * | 6/2002 | LeBlanc | 370/352 |

(Continued)

FOREIGN PATENT DOCUMENTS

| | | |
|---|---|---|
| JP | 2011182186 | 9/2011 |
| WO | 2006109207 | 10/2006 |

OTHER PUBLICATIONS

Invitation to Pay Additional Fees, From PCT/US2009/067360, mailed on Mar. 8, 2010, 5 pages.

(Continued)

*Primary Examiner* — Henry Tsai
*Assistant Examiner* — Christopher Bartels
(74) *Attorney, Agent, or Firm* — Rory D. Rankin; Meyertons, Hood, Kivlin, Kowert & Goetzel, P.C.

(57) ABSTRACT

Systems and methods for preventing excessive buffering of transactions in a coherence point. The coherence point uses a lookahead mechanism to determine if there are enough credits from the memory controller for forwarding the outstanding transactions stored in the IRQ. If there are not enough credits, then the coherence point prevents the switch fabric from forwarding additional transactions to the coherence point. By preventing excessive buffering in the IRQ, the QoS-based ordering of transactions performed by the switch fabric is preserved.

22 Claims, 8 Drawing Sheets

(56) References Cited

U.S. PATENT DOCUMENTS

| | | | |
|---|---|---|---|
| 2002/0147889 A1* | 10/2002 | Kruckemyer et al. | 711/144 |
| 2002/0159385 A1 | 10/2002 | Susnow et al. | |
| 2003/0156542 A1* | 8/2003 | Connor | 370/236 |
| 2003/0226046 A1 | 12/2003 | John | |
| 2004/0019714 A1 | 1/2004 | Kelley et al. | |
| 2004/0049564 A1 | 3/2004 | Ng et al. | |
| 2004/0160971 A1* | 8/2004 | Krause et al. | 370/412 |
| 2004/0210695 A1* | 10/2004 | Weber | G06F 9/526 710/240 |
| 2004/0268017 A1* | 12/2004 | Uzrad-Nali et al. | 711/1 |
| 2005/0060558 A1 | 3/2005 | Hussain et al. | |
| 2005/0169290 A1 | 8/2005 | Sumita | |
| 2005/0213693 A1* | 9/2005 | Page | 375/354 |
| 2005/0259651 A1 | 11/2005 | Yashima | |
| 2006/0018332 A1* | 1/2006 | Kakani | H04L 1/1614 370/428 |
| 2006/0294112 A1* | 12/2006 | Mandato | H04L 29/06027 |
| 2007/0008902 A1* | 1/2007 | Yaramada | H04L 12/5695 370/252 |
| 2007/0121495 A1 | 5/2007 | Breti et al. | |
| 2008/0126606 A1 | 5/2008 | Wang et al. | |
| 2008/0256271 A1* | 10/2008 | Breed | G06F 12/06 710/52 |
| 2008/0316921 A1* | 12/2008 | Mathews | H04L 47/10 370/230 |
| 2009/0154456 A1 | 6/2009 | Dodson et al. | |
| 2009/0254692 A1 | 10/2009 | Feehrer | |
| 2009/0292575 A1* | 11/2009 | Ellebracht et al. | 705/8 |
| 2010/0165846 A1* | 7/2010 | Yamaguchi et al. | 370/236 |
| 2010/0195503 A1* | 8/2010 | Raleigh | 370/235 |
| 2011/0191650 A1* | 8/2011 | Yokokawa | 714/752 |
| 2013/0159633 A1* | 6/2013 | Lilly | G06F 12/084 711/146 |

OTHER PUBLICATIONS

PCI Express Base Specification, Rev. 1.0a, 2002, pp. 100-110, 123-127.

U.S. Appl. No. 11/523,330, entitled "Managed Credit Update", filed Sep. 19, 2006.

International Search Report and Written Opinion from PCT/US2009/067360 mailed on Jun. 2, 2010, 18 pages.

U.S. Appl. No. 13/944,462, entitled "Transaction Flow Control Using Credit and Token Management", filed Jul. 17, 2013.

* cited by examiner

Computer Readable Medium 210

CREDIT LOOKAHEAD MECHANISM

BACKGROUND

Field of the Invention

The present invention relates generally to the field of computer systems, and in particular to methods and mechanisms for processing memory transactions.

Description of the Related Art

To prioritize the movement of memory requests through a system on chip (SoC) fabric, a quality-of-service (QoS) mechanism may be implemented such that an agent generating a memory request may also provide information representing the QoS level associated with that request. In a typical scenario, arbiters and queues in the path of a memory request or transaction containing QoS information should be capable of processing that information—or at least of forwarding the information to a subsequent circuit which is then capable of processing it.

A SoC may include a coherence point to act as a gateway between the coherent and non-coherent domains of the SoC. The coherence point may include a queue for storing in-flight transactions. Utilizing a QoS-aware arbiter to decide which transactions to read out of the queue may be expensive in terms of size and power. Therefore, to reduce the size and power consumption of the SoC, a non-QoS-aware arbiter may be used in the coherence point. However, this may lead to performance issues if reordering of transactions in the coherence point causes a loss of the already performed QoS-based arbitration already.

SUMMARY

Systems and methods for using a credit lookahead mechanism within a coherence point are contemplated.

A system on chip (SoC) may include a processor complex, switch fabric, coherence point, and a memory controller. The switch fabric may be configured to process transactions according to the QoS level of the transaction and then forward the transactions to the coherence point. The coherence point may include an input request queue (IRQ) for storing transactions received from the switch fabric. The memory controller may be configured to send credits to the coherence point to allow transactions to proceed from the coherence point to the memory controller.

The coherence point may also include credit lookahead logic for determining if the existing transactions stored in the IRQ are able to make forward progress. If the credit lookahead logic determines that there are enough credits for the existing transactions to be sent to the memory controller, then the switch fabric may be allowed to send new transactions to the coherence point. If the credit lookahead logic determines that that there are not enough credits for the existing transactions, then transactions may be prevented from being sent from the switch fabric to the coherence point.

In one embodiment, the switch fabric may include a QoS-aware arbiter, while the coherence point may include a non-QoS-aware arbiter. The non-QoS-aware arbiter in the coherence point may not forward transactions based on their QoS level. Therefore, to avoid losing the QoS-aware ordering performed by the switch fabric, the credit lookahead logic may keep track of the number of credits that have been received from the memory controller. The credit lookahead logic may also keep track of the number of outstanding transactions that are currently stored in the IRQ that will need credits to advance to the memory controller. The credit lookahead logic may compare the number of credits to the number of outstanding transactions, and if the difference falls below a threshold, then the switch fabric may be stalled to prevent transactions from being forwarded to the IRQ.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a coherence point . . . ." Such a claim does not foreclose the system from including additional components (e.g., a processor complex, a memory controller, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a memory controller having five ports, the terms "first" and "second" ports can be used to refer to any two of the five ports.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
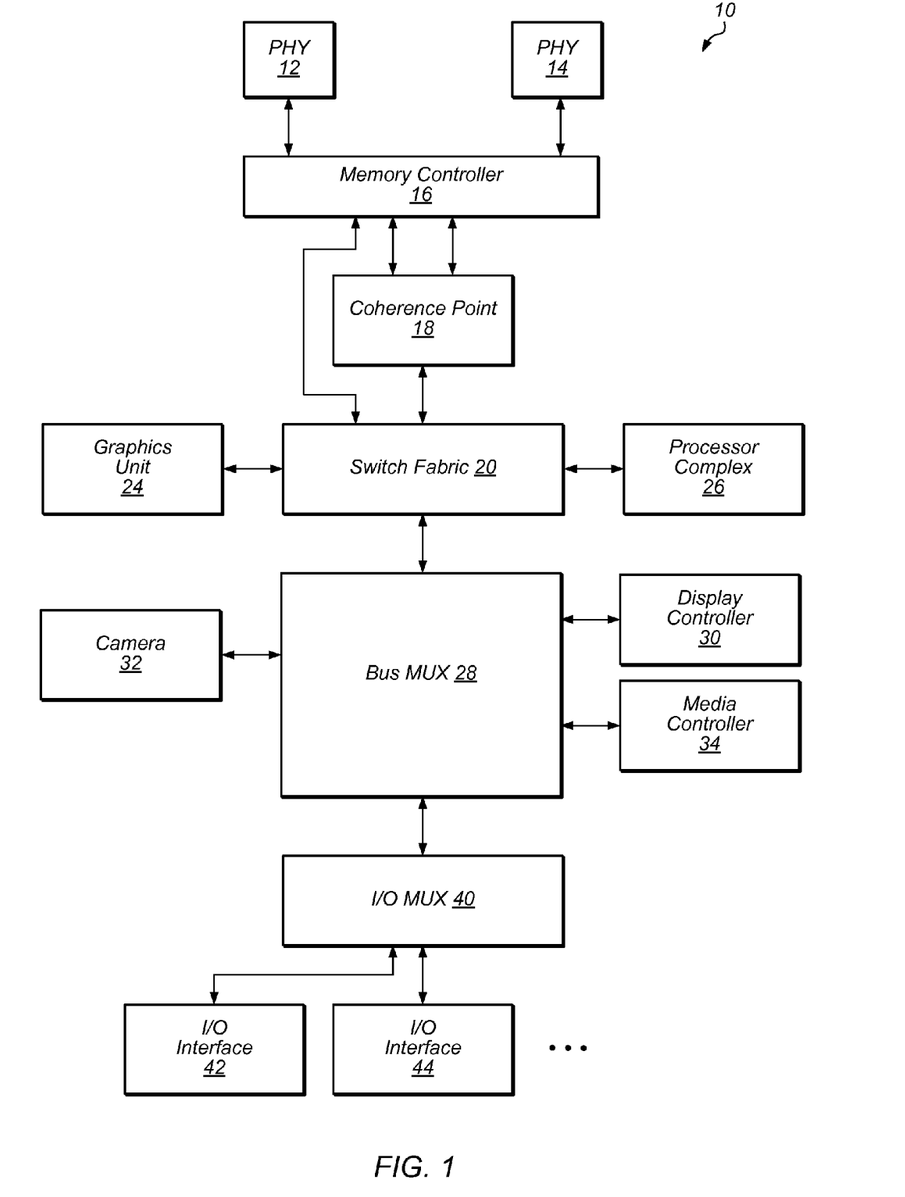
FIG. 1 is a block diagram that illustrates one embodiment of a portion of an IC.

Referring now to FIG. 1, a block diagram illustrating one embodiment of a portion of an integrated circuit (IC) is shown. In the illustrated embodiment, IC 10 includes processor complex 26, coherence point 18, switch fabric 20, graphics unit 24, bus mux 28, display controller 30, media controller 34, camera 32, input/output (I/O) mux 40, I/O interfaces 42 and 44, memory controller 16, and memory physical interface circuits (PHYs) 12 and 14. It is noted that IC 10 may also include many other components not shown in FIG. 1 and/or omit one or more of the components shown. In various embodiments, IC 10 may also be referred to as a system on chip (SoC), an application specific integrated circuit (ASIC), or an apparatus. Clock sources, such as phase lock loops (PLLs), and power sources are not shown for ease of illustration.

Components shown within IC 10 may be coupled to each other using any suitable bus and/or interface mechanism. In some embodiments, these components may be connected using ARM Holdings' Advanced Microcontroller Bus Architecture (AMBA®) protocol or any other suitable on-chip interconnect specification for the connection and management of logic blocks. Examples of AMBA® buses and/or interfaces may include Advanced eXtensible Interface (AXI), Advanced High-performance Bus (AHB), Advanced System Bus (ASB), Advanced Peripheral Bus (APB), Advanced Trace Bus (ATB), etc. Other types of bus and interface mechanisms, such as specialty or proprietary interfaces with custom protocols, may also be utilized to provide connections between any of the various components of IC 10.

Processor complex 26 may include any number of central processing units (CPUs) (not shown), a supporting cache hierarchy including a level two (L2) cache (not shown), and multiple other components and logic. The CPU(s) of processor complex 26 may include circuitry to execute instructions defined in an instruction set architecture. Specifically, one or more programs comprising the instructions may be executed by the CPU(s). Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In various embodiments, coherence point 18, switch fabric 20, bus mux 28, and I/O mux 40 may constitute a communication fabric (or fabric) for providing a top-level interconnect for IC 10. In various embodiments, different types of traffic may flow independently through the fabric. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels. In other embodiments, the fabric shown in FIG. 1 may include one or more other units, two or more units may be combined into a single unit, and/or one or more units may be omitted.

Coherence point 18 may be configured to act as a gateway between the coherent and non-coherent domains in IC 10. Coherence point 18 may be the location in IC 10 where memory operations become globally visible. Coherence point 18 may also include L2 duplicate tags (not shown), which are tags from the L2 cache (in processor complex 26) for all coherent agents in IC 10 and which may be snooped by coherence point 18 for coherency operations. Coherence point 18 may also include additional logic (e.g., coherence control unit, memory interface unit, current transaction table, dependency logic unit) not shown in FIG. 1. For example, in various embodiments, coherence point 18 may include cache coherency logic employing a cache coherency protocol to ensure data accessed by each agent is kept up to date. An example of a cache coherency protocol includes the MOESI protocol with the Modified (M), Owned (O), Exclusive (E), Shared (S), and Invalid (I) states. Coherence point 18 may be coupled to switch fabric 20, and coherence point 18 may be coupled to other devices of IC 10 via switch fabric 20. Switch fabric 20 may be used to aggregate traffic from multiple devices within IC 10. In some embodiments, coherence point 18 and switch fabric 20 may be integrated within a single structure which may be referred to as a coherent switch.

Coherence point 18 may allow memory access requests from any requestor in IC 10 to snoop the cache hierarchy of processor complex 26. Thus, data produced by the CPUs of processor complex 26 may not be explicitly flushed for the data to be visible to the other devices and agents of IC 10. If the most recent copy of data is present in the cache hierarchy, then read requests may receive the most recent copy from the cache hierarchy. For write requests, merging may be performed for a cache line present in the cache hierarchy for any requestor in IC 10.

In one embodiment, coherence point 18 may send a sideband signal to stall switch fabric 20 if the memory controller credits needed by the outstanding transactions stored in coherence point 18 are nearing the number of credits received from memory controller 16. While switch fabric 20 is preventing from sending transactions to coherence point 18, coherence point 18 may process the previously received transactions. When the stall is released, switch fabric 20 may then select the highest QoS-level transactions to send to coherence point 18, and these in turn may be processed in a more accelerated manner by coherence point 18 since the number of outstanding transactions will have been reduced. Therefore, the amount of reordering that occurs in coherence point 18 can be kept to a minimum to preserve the QoS-based ordering performed by switch fabric 20.

Bus mux 28 is coupled to memory via switch fabric 20, and bus mux 28 is also coupled to display controller 30, media controller 34, and camera 32. Bus mux 28 may also be referred to as an IC mux or SoC mux. In other embodiments, bus mux 28 may also be coupled to other devices (e.g., flash controller) not shown in FIG. 1. Bus mux 28 is also coupled to I/O mux 40, which is coupled to I/O interfaces 42 and 44.

I/O interfaces 42 and 44 are representative of any number of I/O interfaces or devices connected to I/O mux 40. I/O interfaces 42 and 44 may provide interfaces to any type of peripheral device implementing any hardware functionality included in the system. For example, I/O interfaces 42 and 44 may connect to audio peripherals such as microphones, speakers, interfaces to microphones and speakers, audio processors, digital signal processors, mixers, etc. Other I/O devices may include interface controllers for various interfaces external to IC 10, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a DAC, and so forth. Other I/O devices may also include networking peripherals such as media access controllers (MACs).

IC 10 may group processing blocks associated with non-real-time memory performance, such as the media controller 34, for image scaling, rotating, and color space conversion, accelerated video decoding for encoded movies, audio processing and so forth. Camera 32 and media controller 34 may include analog and digital encoders, decoders, and other signal processing blocks. In other embodiments, the IC 10 may include other types of processing blocks in addition to or in place of the blocks shown.

Memory controller 16 may include one or more memory caches (not shown). The memory caches may be used to reduce the demands on memory bandwidth and to reduce power consumption. The allocation policy for the memory caches may be programmable. Memory controller 16 may include any number of memory ports and may include circuitry configured to interface to memory. For example, memory controller 16 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc. Memory controller 16 may also be coupled to memory physical interface circuits (PHYs) 12 and 14. Memory PHYs 12 and 14 are representative of any number of memory PHYs which may be coupled to memory controller 16. Memory PHYs 12 and 14 may be configured to interface to memory devices (not shown). Memory PHYs 12 and 14 may handle the low-level physical interface to the memory devices. For example, the memory PHYs 12 and 14 may be responsible for the timing of the signals, for proper clocking to synchronous DRAM memory, etc.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 10 may differ from those shown in FIG. 1. For example, direct connections between components may be used for components that are not directly connected in FIG. 1, and components with direct connections in FIG. 1 may instead connect via one or more other components.

Figure 2:
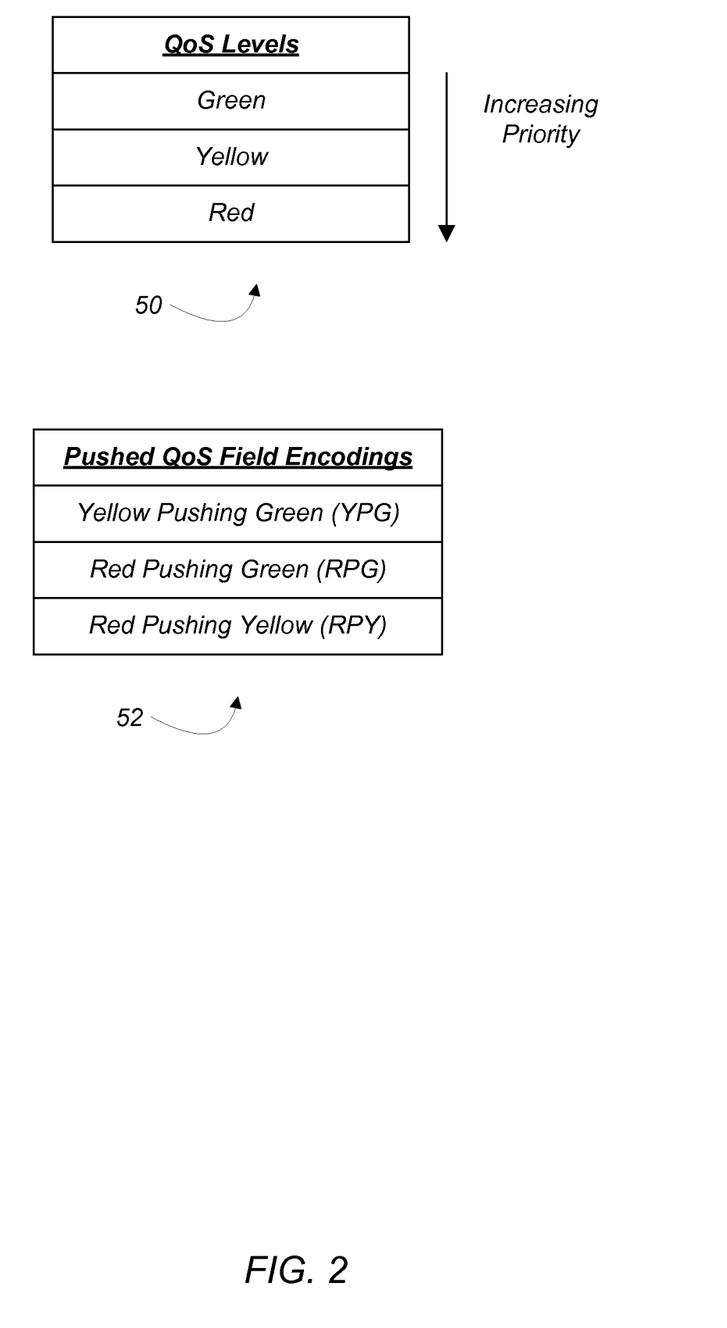
FIG. 2 is a pair of tables illustrating QoS levels.

Turning next to FIG. 2, a pair of tables 50 and 52 are shown illustrating a definition of a set of original QoS levels and a set of pushed QoS field encodings, respectively, for one embodiment. Other embodiments may include additional or substitute levels, and other embodiments may include additional levels in combination with a subset of the illustrated levels. As illustrated by the arrow pointing downward next to the table 50 in FIG. 2, the table 50 illustrates the QoS levels within a set in increasing priority. That is, the green QoS level is the lowest priority QoS level, the yellow QoS level is the medium priority QoS level, and the red QoS level is the highest priority QoS level. A source may assign a QoS level to a given transaction based on the priority of the given transaction.

It is noted that the term "transaction" may be used to refer to a "memory transaction", "input/output (I/O) transaction", or other type of transaction. Generally speaking, a transaction may comprise a memory request, and the term "memory request" is not limited to requests that are ultimately responded to by memory, but can also include requests that are satisfied by a cache. It is also noted that the terms "memory request" and "transaction" may be used interchangeably throughout this disclosure.

The green, yellow, and red QoS levels may reflect relative levels of urgency from a source. That is, as the amount of time before data is needed by the source to prevent erroneous operation decreases, the QoS level assigned to each transaction increases to indicate the higher urgency. By treating transactions having higher urgency with higher priority, data may be returned to the source more quickly and may thus aid the correct operation of the source.

For example, a display pipe may initiate the reading of frame data from memory for the next frame to be displayed in the vertical blanking interval for the display. The frame is not actually displayed until the end of the vertical blanking interval, and thus the display pipe may use the green level during this time period. As the frame begins to be displayed (i.e. the display controller begins reading frame pixels from the display pipe output), the display pipe may raise the QoS level of frame data read operations to the memory to the yellow level. For example, if the amount of frame data that is read ahead of the current pixel being displayed reduces below a first threshold, the level may be raised to yellow. At a second threshold (lower than the first threshold), the display pipe may raise the QoS level of memory operations to red.

Transactions may be escalated from a low QoS level to a high QoS level based on a variety of criteria or triggers. When a transaction with an original low QoS level is escalated to a higher QoS level, the transaction may be assigned one of the QoS field encodings shown in table 52. For example, a transaction may be originally assigned a green QoS level, and this transaction may be pushed to a yellow QoS level somewhere along the path to its destination. Therefore, this transaction may be assigned a yellow pushing green (YPG) QoS field encoding. Similarly, if a transaction with an original QoS level of green is pushed to a red QoS level, this transaction may be assigned a red pushing green (RPG) QoS field encoding. Still further, if a transaction with an original QoS level of yellow is pushed to a red QoS level, this transaction may be assigned a red pushing yellow (RPY) QoS field encoding. In one embodiment, various arbiters within the bus fabric of the SoC may treat RPG and RPY transactions as the equivalent of red transactions. Also, arbiters may treat YPG transactions as the equivalent of yellow transactions.

Figure 3:
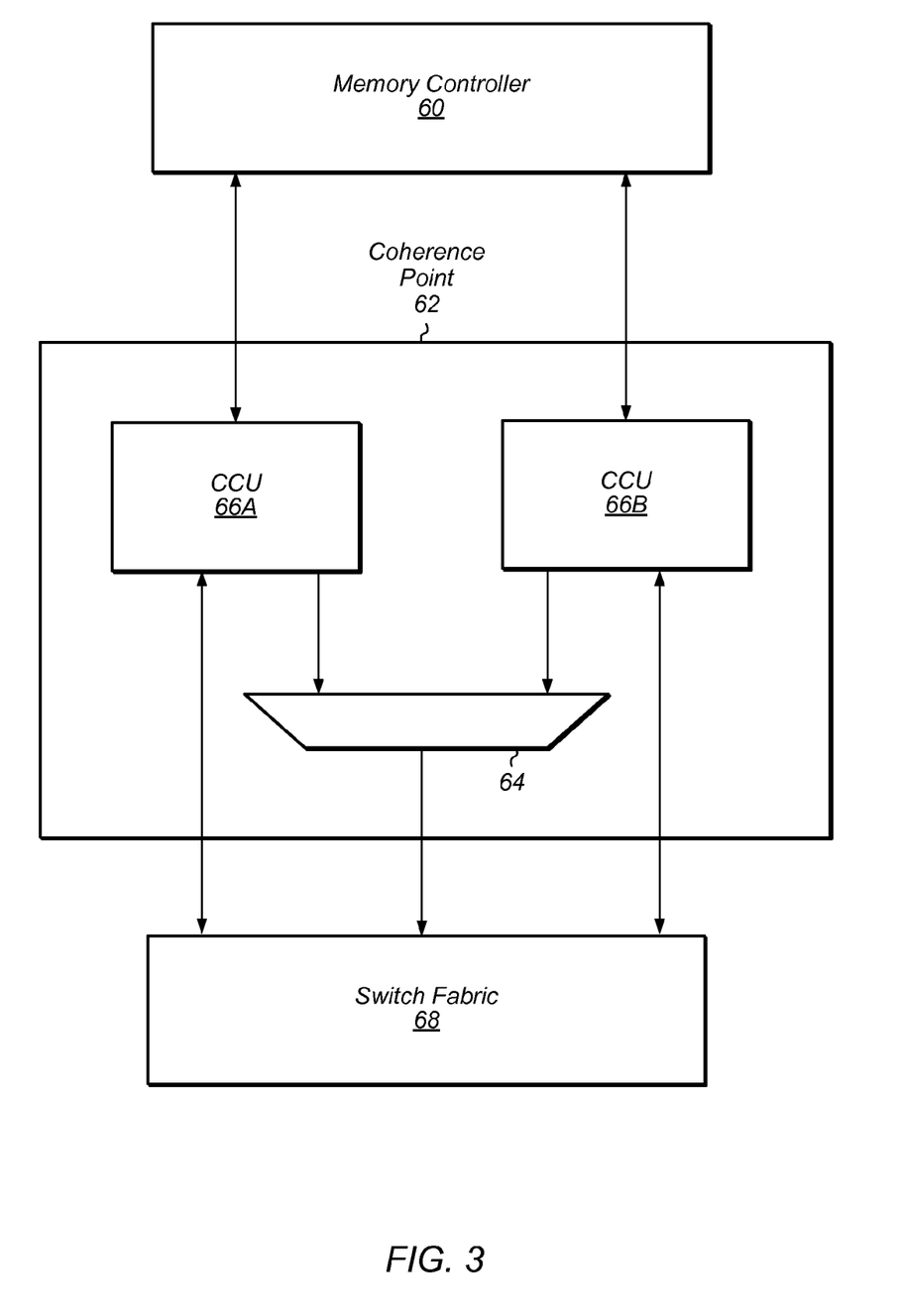
FIG. 3 is a block diagram that illustrates one embodiment of a coherence point coupled to a memory controller and switch fabric.

It will be understood that the QoS levels shown in tables 80 and 82 of FIG. 3 are merely illustrative and should not be construed as implying any limitations upon the scope of the methods and mechanisms described herein. While the rest of this disclosure will be described in terms of transactions being assigned QoS levels from the tables 80 and 82, it is to be understood that other QoS schemes may be employed in other embodiments with more or fewer than three different QoS levels. Furthermore, other embodiments may represent the different QoS levels with designators other than colors.

Referring now to FIG. 3, a block diagram of one embodiment of a coherence point coupled to a memory controller and switch fabric is shown. Coherence point 62 may include two separate coherence control units (CCUs) 66A and 66B, which may be referred to as left and right channels, respectively. It is noted that in other embodiments, coherence point 62 may have other numbers of CCUs (e.g., 1, 4, 8). Coherence point 62 may also include demux 64 for sending traffic to switch fabric 68 from CCUs 66A and 66B. It is noted that coherence point 62 and CCUs 66A and 66B may also include other logic and units not shown in FIG. 3 to avoid obscuring the figure.

A given transaction may be routed to one of the CCUs 66A or 66B based on an address hash function that is performed on the request address of the given transaction. In one embodiment, this address hash function may be performed in switch fabric 68 for transactions being sent to coherence point 62. When a transaction is received by a given CCU 66, the CCU 66 may store the transaction in an available entry of a current transaction table (CTT) (not shown). The entry may remain in the CTT until all processing associated with the transaction has been completed within coherence point 62. The CTT may include any number of entries for storing attributes associated with outstanding transactions. Each of CCUs 66A and 66B may be configured to monitor the number of transactions that have been received and are waiting to be sent to memory controller 60. Each CCU 66 may also calculate the number of credits needed to forward the number of received transactions to the memory controller.

Transactions that target memory may be sent from coherence point 62 to memory controller 60. Memory controller 60 may send credits to each CCU 66 of coherence point 62, and the credits may be used for sending transactions to memory controller 60. Each CCU 66 may monitor a number of received credits that have been received from memory controller 60 and not yet used for sending transactions. Each CCU 66 may compare this number of received credits to the number credits needed by the outstanding transactions waiting to be sent to memory controller 60. If the number of credits needed by the outstanding transactions is within a threshold of the number of received credits, then a stall signal may be sent to switch fabric 68 to prevent switch fabric 68 from sending additional transactions to coherence point 62.

The threshold may be programmable and may vary from embodiment to embodiment. In one embodiment, the threshold may be based on the roundtrip time that it takes for the stall to take effect. For example, if it takes three clock cycles for the stall to take effect, and one transaction can be sent on each clock cycle, then the threshold may be set to three. In this way, if additional transactions are sent from switch fabric 68 to coherence point 62 after the stall signal has been sent and prior to the stall taking effect, there will be enough credits available to send these transactions to memory controller 60.

In one embodiment, each CCU 66 may continuously monitor and compare the number of received credits and the number of outstanding transactions. After the stall signal has been sent, when the CCU 66 determines that the difference between the number of received credits and the number of credits needed by the outstanding transactions has increased and is now greater than the threshold, then the CCU 66 may send a signal to switch fabric 68 to release the stall.

In some scenarios, one CCU may have enough credits for sending all of the transactions (plus extra credits in excess of the threshold) while another CCU may not have enough credits. In these cases, one CCU may send a stall signal to switch fabric 68 while the other CCU may still allow switch fabric 68 to continue sending transactions forward.

Figure 4:
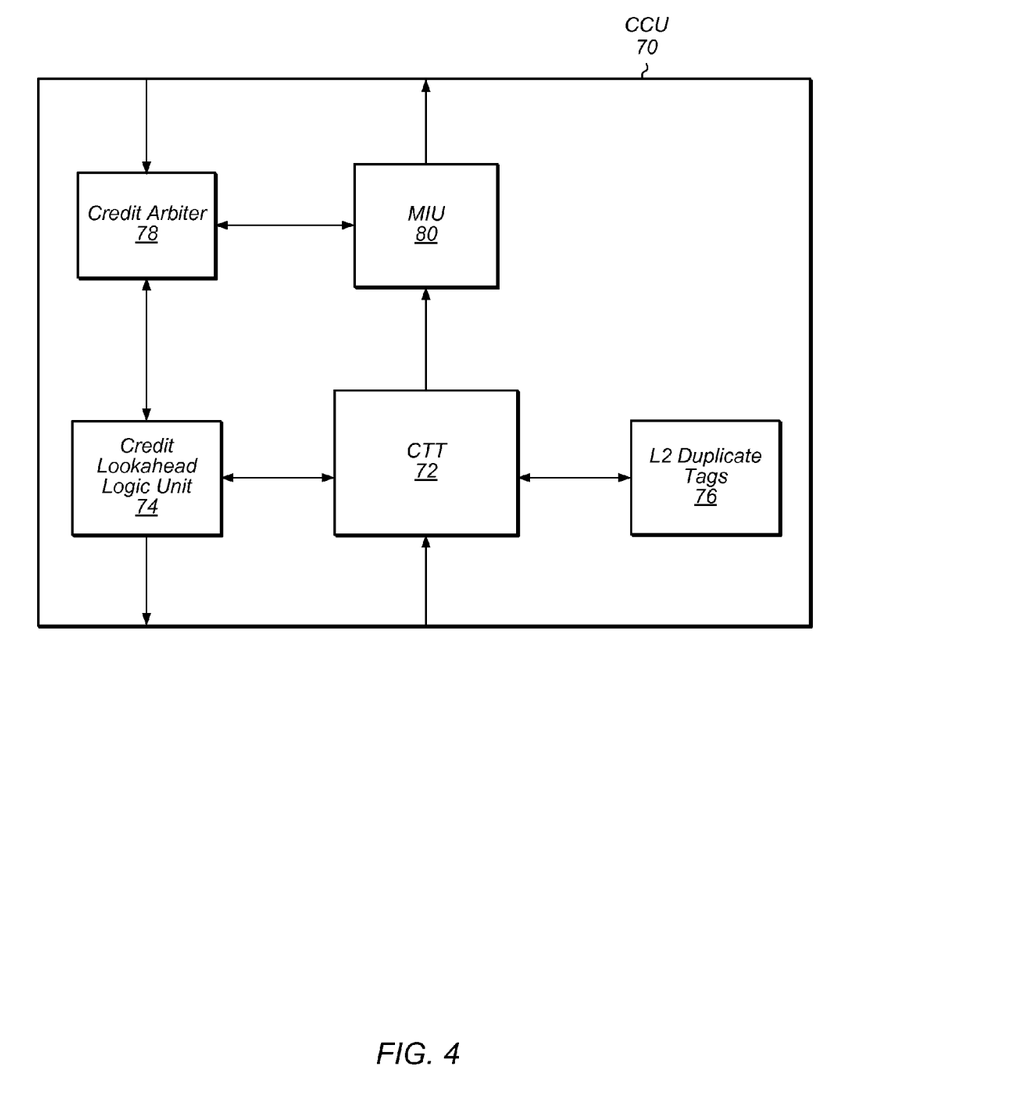
FIG. 4 is a block diagram of one embodiment of a coherence control unit (CCU).

Turning now to FIG. 4, a block diagram of one embodiment of a coherence control unit (CCU) is shown. CCU 70 may include current transaction table (CTT) 72, credit lookahead logic unit 74, L2 duplicate tags 76, credit arbiter 78, and memory interface unit (MIU) 80. L2 duplicate tags unit 76 may include duplicate tags from the L2 cache(s) in the CPU(s) of the processor complex. CTT 72 may store information associated with the outstanding in-flight transactions that have been received by the coherence point but have not yet been completed. Although CTT 72 is shown as a single block, CTT 72 may include multiple structures, such as an input request queue (IRQ), victim address queue, victim data queue, CTT entry attribute queue, and one or more other data structures. CTT 72 may be coupled to MIU 80, which may be configured to provide the interface from the coherence point to the memory controller.

Credit arbiter 78 may receive credits from the memory controller (not shown) and then determine if transactions may be sent to the memory controller via MIU 80. In some embodiments, credit arbiter 78 may be located in MIU 80. Credit lookahead logic unit 74 may be configured to determine if there are enough credits in credit arbiter 78 to send the outstanding transactions stored in CTT 72 to the memory controller. In various embodiments, credit lookahead logic unit 74 may be implemented as hardware, software, or any combination thereof.

After a transaction is received by CCU 70, an available entry may be allocated for the new transaction in CTT 72. Also, after the transaction is received, one or more dependency logic units (not shown) may determine if there are any dependencies between the new transaction and the existing transactions stored in CTT 72. After any dependencies have been resolved, then the new transaction may access L2 duplicate tags 76 to determine if the data targeted by the new transaction is stored in a L2 cache of any processor complex.

If a given transaction hits in L2 duplicate tags 76, then the transaction may access a L2 cache in the processor complex. In some embodiments, this transaction may not be sent to the memory controller, and so a credit will not be needed for this transaction. While this transaction will still be stored in an entry in CTT 72 until all necessary processing is completed, this transaction can be subtracted from the count of outstanding transactions and/or one or more credits may be subtracted from the count of credits needed.

In one embodiment, write pushing may be utilized for write transactions that hit in L2 duplicate tags 76. Write pushing may involve proactively updating the corresponding cache line in the corresponding L2 of the processor complex when a write transaction hits in L2 duplicate tags 76 but not updating the corresponding address in memory. For example, if a write transaction hits in L2 duplicate tags 76, then the data for the write transaction may be sent to update the corresponding cache line in the L2 but not to memory. Then, the state of this cache line in the L2 may be kept in a modified, owned, or dirty state.

When a new transaction is stored in an entry of CTT 72, the count of credits needed by CCU 70 to service its outstanding transactions may be incremented. The new transaction may be a read or write request, and in some embodiments, some requests may require more than a single credit. For example, some write requests may include two data beats, and these write requests will require one command credit and two data credits to be sent to the memory controller. Therefore, when a 2-beat write request is received by CCU 70, unit 74 may increment the count of data credits needed by two. In embodiments that utilize write pushing, if this 2-beat write request hits in L2 duplicate tags 76, then the count of command credits needed may be decremented by one and the count of data credits needed may be decremented by two since this write request will not be going to memory via the memory controller. Similarly, if a read request hits in L2 duplicate tags 76, and the read request will not be sent to the memory controller, then the count of command credits may be decremented by one.

In other embodiments, write pushing may not be utilized, and if a write request hits in L2 duplicate tags 76, the cache line in the corresponding L2 cache may be invalidated. Then, the write request will write the data to memory via the memory controller, and so the write request will need memory controller credits. Therefore, in these embodiments, the count of credits may not be decremented if there is a hit for a write request in L2 duplicate tags 76.

In some embodiments, the number of credits that are needed for a given write request may vary depending on if the write request modifies a full cache line or only part of a cache line. For example, if a partial write request hits in L2 duplicate tags 76 and the state of the hit cache line is dirty, then additional credits may be needed to perform a merge operation for the cache line. In this example, the cache line may be retrieved from the corresponding L2 cache and written to memory. In one embodiment, this may require one command credit and two data credits. Next, the data of the partial write request may be written to memory and this may require one command credit and one or two data credits. Therefore, in these embodiments, if a partial write request is a hit in L2 duplicate tags 76, the number of credits that are needed may be increased to account for the number of command and data credits needed for the merge operation.

In some embodiments, the memory controller may include a memory cache, and read requests may be speculatively issued to the memory cache. In these embodiments, there may be parallel pathways for read requests to L2 duplicate tags 76 and the memory cache. In other words, a lookup of L2 duplicate tags 76 may be performed for the read request while at the same time a speculative lookup of the memory cache may be performed. A command credit may be consumed when the read request is sent to the memory cache, so even if the read request hits in L2 duplicate tags 76, the read request will already have used a command credit. However, in some embodiments, the memory controller may receive the address of the read request through another pathway external to CCU 70, and so a read request that hits in L2 duplicate tags 76 will not end up needing a command credit to access the memory controller. In these embodiments, the count of command credits needed may be decremented by one if a read request hits in L2 duplicate tags 76.

In some embodiments, unit 74 may maintain a count of the available credits. The term "available credits" refers to credits that have been received from the memory controller that are in excess of any credits that are needed by transactions already stored in CTT 72. For example, if 10 credits have been received from the memory controller and the currently outstanding transactions need 7 credits to be sent to the memory controller, then there are 3 available credits. If a new transaction is received by CCU 70, then the count of available credits may be decremented by the number of credits needed by the new transaction. Unit 74 may compare the count of available credits to the threshold and allow or prevent new transactions from being sent to CCU 70 based on this comparison.

In some embodiments, multiple different types of credits may be sent from the memory controller to credit arbiter 78, and the type of credit that is used may depend on the type of transaction that is being sent to the memory controller. In these embodiments, unit 74 may maintain multiple separate counts of the different types of credits. Unit 74 may also maintain multiple separate counts of the different types of outstanding transactions stored in CTT 72. For example, in one embodiment, separate counts may be maintained for command credits received and needed and separate counts may also be maintained for data credits received and needed. In other embodiments, other numbers and types of credits may be monitored and the counts compared for each separate type.

In these embodiments, unit 74 may compare these multiple counts and determine if the difference is less than the threshold for any of these comparisons. For example, the received data credits may exceed the needed data credits by the corresponding threshold, but the received command credits may not exceed the needed command credits by the corresponding threshold. Therefore, in this scenario, unit 74 may send a stall signal to the switch fabric. Only if all of the different received credit counts exceed their corresponding needed credit counts by the thresholds will the switch fabric be allowed to continue sending transactions to CCU 70.

Figure 5:
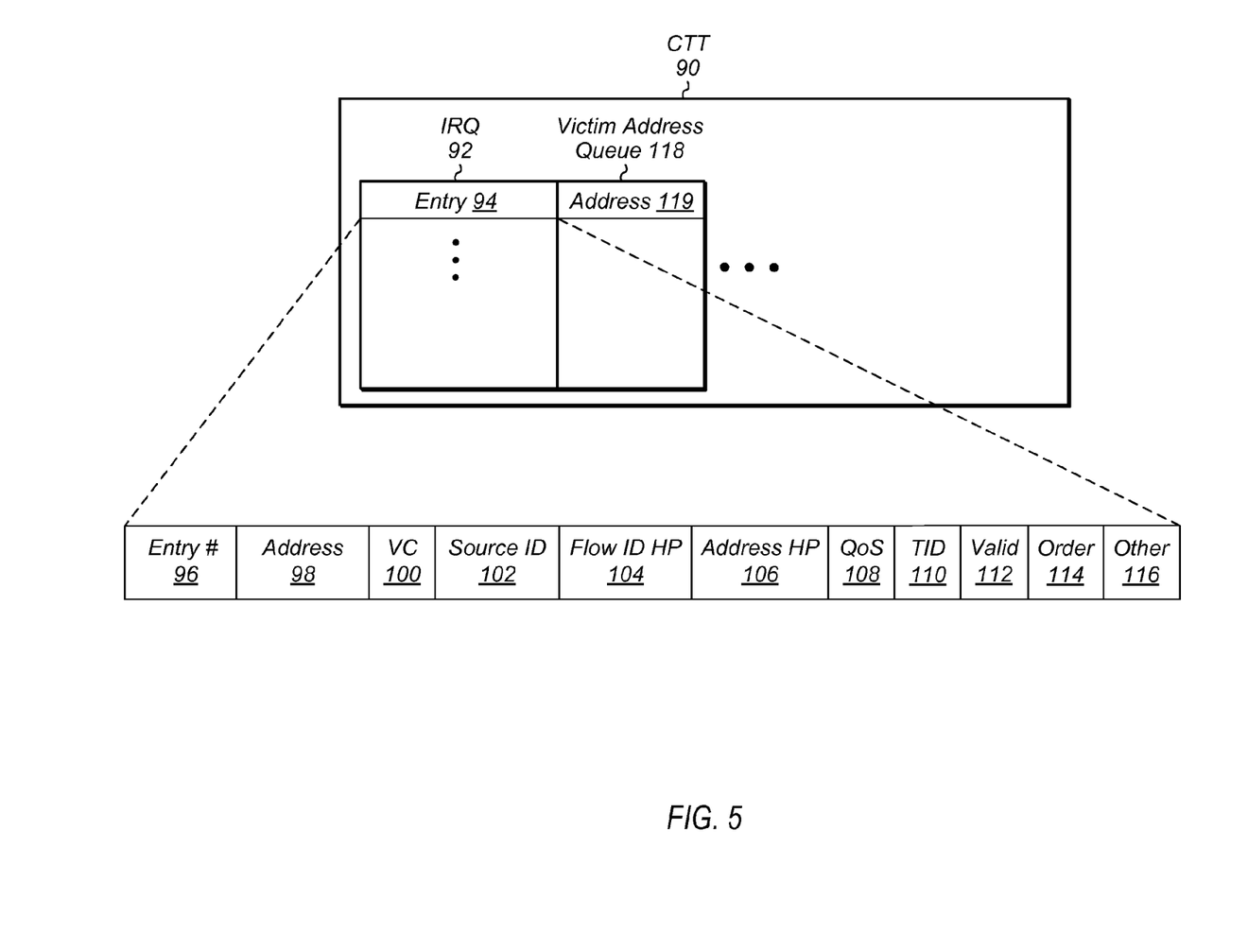
FIG. 5 illustrates one embodiment of an input request queue (IRQ) entry.

Referring now to FIG. 5, a block diagram illustrating one embodiment of an input request queue (IRQ) entry is shown. Current transaction table (CTT) 90 may include multiple queues, such as IRQ 92, victim address queue 118, and other queues, tables, and/or other logic structures. CTT 90 may be located within a coherence point, such as coherence point 62 of FIG. 3. IRQ 92 is representative of any size of queue, with the capacity for storing any number of transactions. In one embodiment, IRQ 92 may store 64 entries, while in other embodiments, IRQ 92 may include other numbers of entries. Victim address queue 118 may store the same number of entries as IRQ 92.

Each entry of IRQ 92 may include multiple attributes associated with a transaction that has been received by the coherence point. Entry 94 is expanded in FIG. 3 to show the attributes that may be stored in a typical entry of IRQ 92. For example, in one embodiment, entry 94 may include an entry number 96, request address 98, virtual channel (VC) 100, source ID 102, flow ID dependency head pointer 104, address dependency head pointer 106, quality of service (QoS) indicator 108, transaction ID (TID) 110, valid indicator 112, ordering attribute 114, and other attribute 116, which is representative of any number of other attributes. The ordering attribute 114 may refer to the device ordered attribute, relaxed ordered attribute, or other types of ordering attributes. The victim address 119 may be stored in victim address queue 118 in an entry in queue 118 corresponding to entry 94 of IRQ 92. Alternatively, in another embodiment, victim address 119 may be stored within entry 94 of IRQ 92. In other embodiments, entries of IRQ 92 may include various other information and attributes associated with the corresponding transactions and/or omit some of the attributes shown in FIG. 5.

Figure 6:
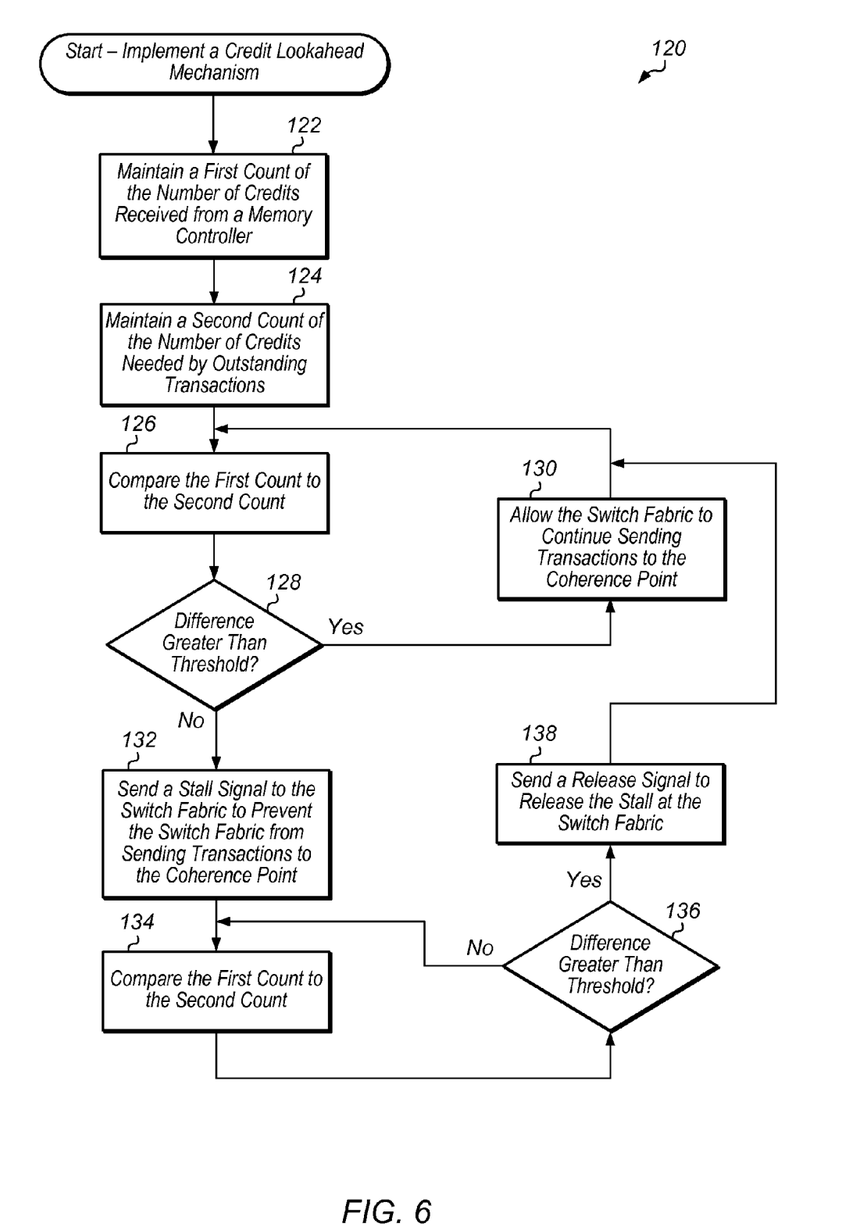
FIG. 6 is a generalized flow diagram illustrating one embodiment of a method for implementing a credit lookahead mechanism.

Turning now to FIG. 6, one embodiment of a method 120 for implementing a credit lookahead mechanism in a coherence point is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a coherence point may maintain a first count of the number of credits received from a memory controller (block 122). The credits may be utilized for sending transactions from the coherence point to the memory controller. The coherence point may also maintain a second count of the number of credits needed by outstanding transactions (block 124). In one embodiment, the coherence point may increment the second count when a new transaction is received and stored in an entry of the IRQ. After the new transaction is stored in an entry in the IRQ, the new transaction may access the L2 duplicate tags and perform a lookup of the tags. If the new transaction hits in the L2 duplicate tags, then the coherence point may decrement the second count. In this case, the new transaction will not be sent to the memory controller and therefore will not be using a memory controller credit. Therefore, the second count may track the number of outstanding transactions that will be using a memory controller credit. In one embodiment, the coherence point may utilize first and second counters to maintain the first and second counts, respectively Next, the coherence point may compare the first count to the second count to determine the difference between these two values (block 126). If the difference between the first and second counts is greater than a predetermined threshold (conditional block 128, "yes" leg), then the coherence point may allow the switch fabric to continue to send transactions to the coherence point (block 130). After block 130, method 120 may return to block 126 to determine the difference between the first and second counts.

If the difference between the first and second counts is less than the predetermined threshold (conditional block 128, "no" leg), then the coherence point may send a stall signal to the switch fabric to prevent the switch fabric from sending new transactions to the coherence point (block 132). While the switch fabric is stalled, the coherence point will continue processing transactions and receiving credits from the memory controller. Next, the coherence point may again compare the first count to the second count to determine the difference between these two values (block 134). If the difference between the first and second counts is greater than the predetermined threshold (conditional block 136, "yes" leg), then the coherence point may send a release signal to the switch fabric to release the stall to allow the switch fabric to send transactions to the coherence point (block 138). After block 138, method 120 may return to block 126 to compare the difference between the first and second counts.

If the difference between the first and second counts is less than the predetermined threshold (conditional block 136, "no" leg), then the coherence point may return to block 134 to compare the difference between the first and second counts. Generally speaking, the coherence point may continuously monitor the difference between the first and second counts and adjust its policy of stalling or releasing the stall based on whether the difference is greater than or less than the threshold.

Figure 7:
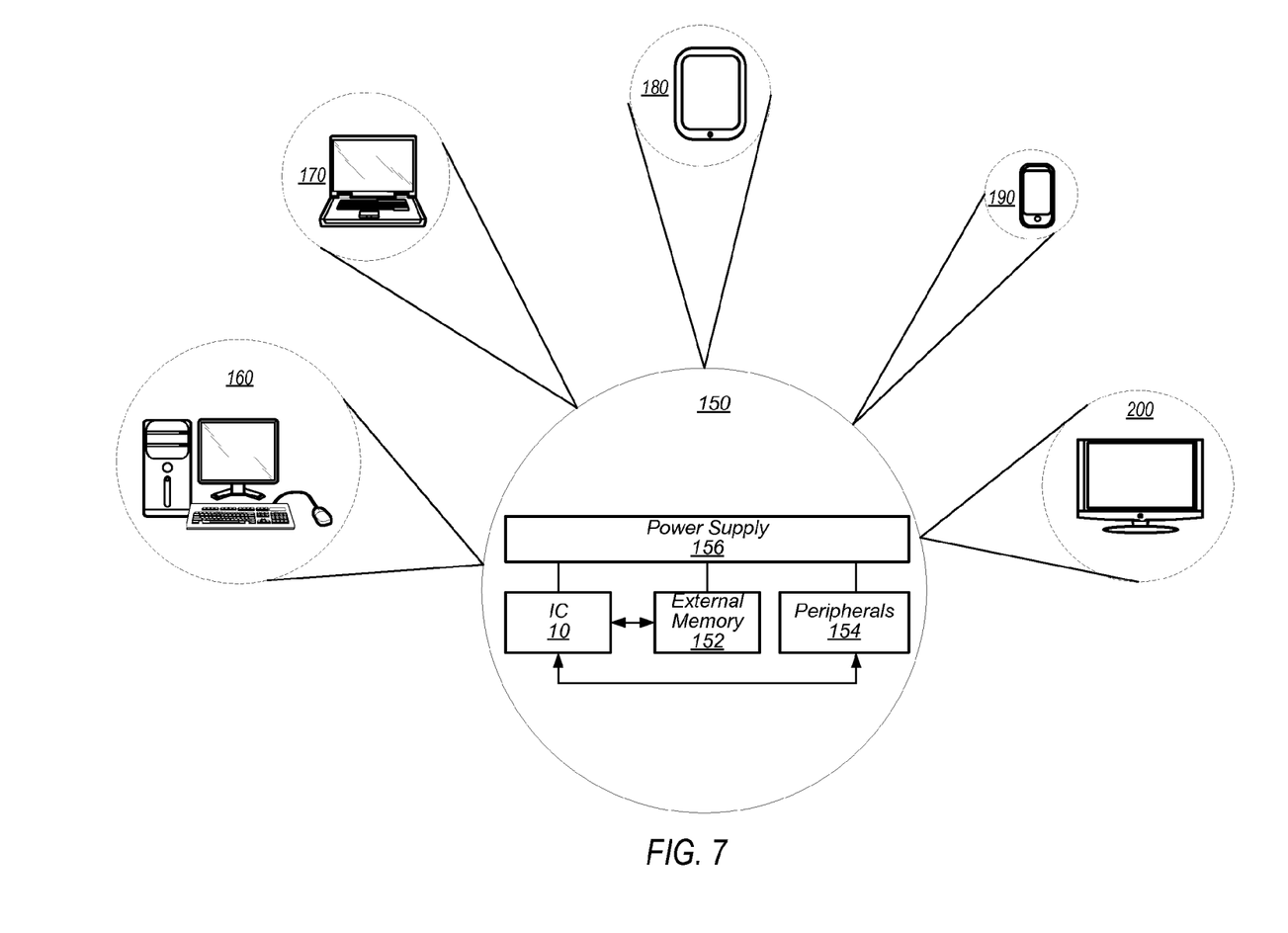
FIG. 7 is a block diagram of one embodiment of a system.

Referring now to FIG. 7, a block diagram of one embodiment of a system 150 is shown. As shown, system 150 may represent chip, circuitry, components, etc., of a desktop computer 160, laptop computer 170, tablet computer 180, cell phone 190, television 200 (or set top box configured to be coupled to a television), or otherwise. In the illustrated embodiment, the system 150 includes at least one instance of IC 10 (of FIG. 1) coupled to an external memory 152.

IC 10 is coupled to one or more peripherals 154 and the external memory 152. A power supply 156 is also provided which supplies the supply voltages to IC 10 as well as one or more supply voltages to the memory 152 and/or the peripherals 154. In various embodiments, power supply 156 may represent a battery (e.g., a rechargeable battery in a smart phone, laptop or tablet computer). In some embodiments, more than one instance of IC 10 may be included (and more than one external memory 152 may be included as well).

The memory 152 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 154 may include any desired circuitry, depending on the type of system 150. For example, in one embodiment, peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multi-touch display screens, keyboard or other input devices, microphones, speakers, etc.

Figure 8:
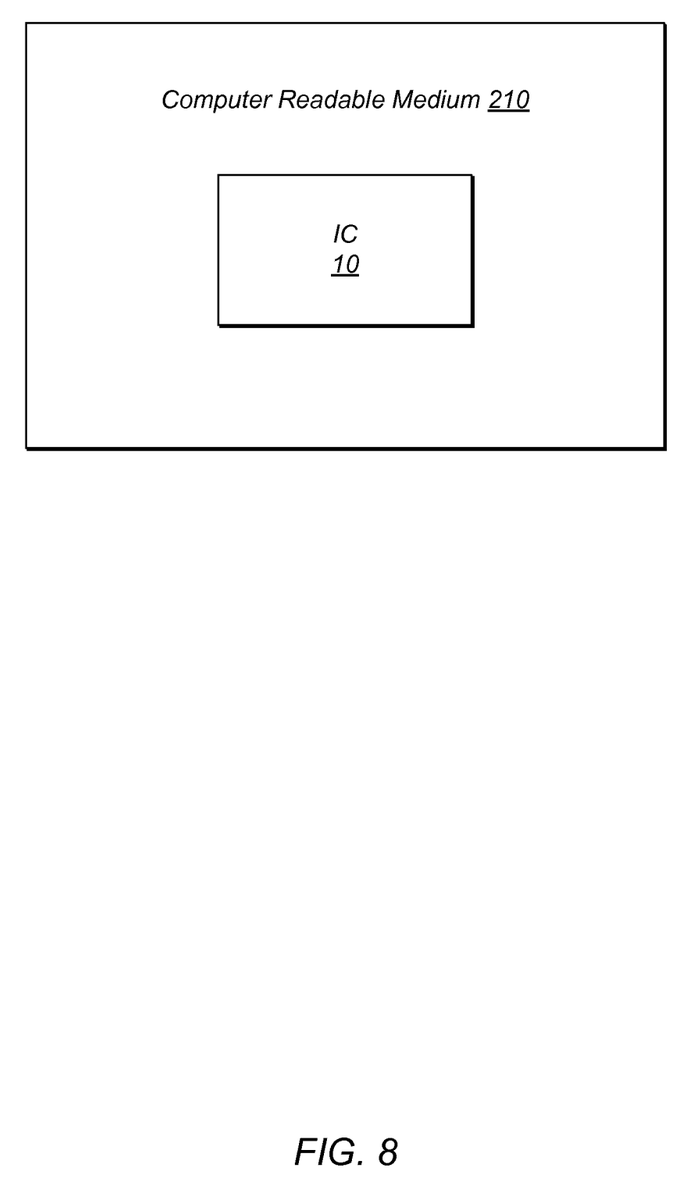
FIG. 8 is a block diagram of one embodiment of a computer readable medium.

Turning now to FIG. 8, one embodiment of a block diagram of a computer readable medium 210 including one or more data structures representative of the circuitry included in IC 10 (of FIG. 1) is shown. Generally speaking, computer readable medium 210 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 210 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 210 may be the netlist(s) (with or without the synthesis library) or the data set(s), as desired. In yet another alternative, the data structures may comprise the output of a schematic program, or netlist(s) or data set(s) derived therefrom. While computer readable medium 210 includes a representation of IC 10, other embodiments may include a representation of any portion or combination of portions of IC 10 (e.g., coherence point 18).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A coherence point comprising an input request queue (IRQ), wherein the coherence point is configured to:
   receive transactions from a plurality of requestors via a switch fabric;
   maintain a first count that represents a number of credits received from a memory controller, wherein the number of credits indicate a number of transactions the memory controller is able to receive from the coherence point for servicing;
   maintain a second count that represents a number of credits needed to service outstanding transactions stored in the IRQ that will be sent to the memory controller;
   responsive to receiving a given transaction, increment the second count;
   responsive to determining an outstanding transaction stored in the IRQ is not to be sent to the memory controller, decrement the second count without removing the outstanding transaction from the IRQ;
   process outstanding transactions stored in the IRQ;
   compare the first count to the second count; and
   responsive to determining a difference between the first count and the second count is less than a predetermined threshold, prevent additional transactions from the plurality of requestors from being sent via the switch fabric to the coherence point while continuing to process transactions stored in the IRQ.

2. The coherence point as recited in claim 1, wherein the coherence point is configured to prevent additional transactions from being sent by sending a stall signal to the switch fabric.

3. The coherence point as recited in claim 1, wherein each transaction includes a quality of service (QoS) attribute and the coherence point comprises a non-QoS-aware arbiter.

4. The coherence point as recited in claim 1, wherein the coherence point further comprises level two (L2) duplicate tags, and wherein to determine whether outstanding transactions stored in the IRQ need to be serviced by the memory controller, the coherence point is configured to perform a lookup of the L2 duplicate tags for outstanding transactions stored in the IRQ.

5. The coherence point as recited in claim 4 wherein the coherence point is configured to decrement the second count responsive to detecting a hit in the L2 duplicate tags for the given transaction.

6. The coherence point as recited in claim 1, wherein responsive to detecting that the given transaction has been completed and is no longer stored in the IRQ, the coherence point is configured to:
   decrement the second count responsive to determining the given transaction has been sent to the memory controller; and
   not decrement the second count responsive to determining the given transaction has been sent to a destination other than the memory controller.

7. A method comprising:
   receiving transactions from a plurality of requestors via a switch fabric;
   maintaining a first count that represents a number of credits received by a coherence point for sending transactions to a memory controller, wherein the first number of credits indicate a number of transactions the memory controller is able to receive from the coherence point for servicing;
   maintaining a second count that represents a number of credits needed to service outstanding transactions stored in a queue in the coherence point that will be sent to the memory controller;
   responsive to receiving a given transaction, incrementing the second count;
   responsive to determining an outstanding transaction stored in the queue is not to be sent to the memory controller, decrementing the second count without removing the outstanding transaction from the queue;
   processing outstanding transactions stored in the queue;
   determining if a difference between the first count and the second count is less than a predetermined threshold; and
   responsive to determining the difference is less than the predetermined threshold, preventing additional transactions from the plurality of requestors from being received via the switch fabric while continuing to process the transactions stored in the queue.

8. The method as recited in claim 7, wherein transactions are stalled at the switch fabric by sending a stall signal from the coherence point to the switch fabric further comprising sending a signal to release the stall responsive to determining the difference is greater than the predetermined threshold.

9. The method as recited in claim 8, further comprising sending a signal to release the stall of transactions at the switch fabric responsive to determining the difference is greater than the predetermined threshold.

10. The method as recited in claim 9, wherein the predetermined threshold is set based on an amount of time for the stall signal to take effect.

11. The method as recited in claim 7, wherein the switch fabric comprises a quality of service (QoS) aware arbiter and the coherence point comprises a non-QoS-aware arbiter.

12. The method as recited in claim 7, wherein responsive to detecting that the given transaction has been completed and is no longer stored in the queue, the method further comprises:
   decrementing the second count responsive to determining the given transaction has been sent to the memory controller; and
   not decrementing the second count responsive to determining the given transaction has been sent to a destination other than the memory controller.

13. A method comprising:
   receiving transactions from a plurality of requestors via a switch fabric;
   maintaining a count that represents a number of available credits in a coherence point, wherein the number of available credits is equal to a number of credits received from a memory controller in excess of a number of credits needed to service outstanding transactions stored in a queue that will be sent to the memory controller, and wherein the number of credits received from the memory controller indicate a number of transactions the memory controller is able to receive from the coherence point for servicing;
   responsive to receiving a given transaction, incrementing the count;
   responsive to determining an outstanding transaction stored in the queue is not to be sent to the memory controller, decrementing the count without removing the outstanding transaction from the queue;
   processing outstanding transactions stored in the coherence point;
   responsive to determining the count is less than a programmable threshold, sending a stall signal to the switch fabric while continuing to process the transactions stored in the coherence point.

14. The method as recited in claim 13, further comprising preventing transactions from the plurality of requestors from being sent to the coherence point via the switch fabric by conveying a stall signal to the switch fabric.

15. The method as recited in claim 14, further comprising sending a release signal to the switch fabric responsive to determining the count is greater than the programmable threshold.

16. The method as recited in claim 14, wherein a roundtrip delay for the stall signal to take effect is equal to a given number of clock cycles, and wherein the programmable threshold is programmed such that it is greater than or equal to the given number.

17. The method as recited in claim 13, wherein responsive to detecting that the given transaction has been completed and is no longer stored in the queue, the method further comprises:

decrementing the count responsive to determining the given transaction has been sent to the memory controller; and
not decrementing the count responsive to determining the given transaction has been sent to a destination other than the memory controller.

18. A system on chip (SoC) comprising:
a memory controller;
a coherence point, wherein the coherence point comprises an input request queue (IRQ) for storing transactions; and
a switch fabric;
wherein the memory controller is configured to send credits to the coherence point, wherein credits indicate a number of transactions the memory controller is able to receive from the coherence point for servicing;
wherein the coherence point is configured to:
   receive transactions from a plurality of requestors via the switch fabric;
   maintain a first count that represents a number of credits received from the memory controller;
   maintain a second count that represents a number of credits needed to service outstanding transactions stored in the IRQ that will be sent to the memory controller;
   responsive to receiving a given transaction, increment the second count;
   responsive to determining an outstanding transaction stored in the IRQ is not to be sent to the memory controller, decrement the second count without removing the outstanding transaction from the IRQ;
   process transactions stored in the IRQ;
   compare the the first count to the second count; and
   responsive to determining a difference between the first count and the second count is less than a programmable threshold,
      prevent additional transactions from the plurality of requestors from being sent via the switch fabric to the coherence point while continuing to process the transactions stored in the IRQ.

19. The SoC as recited in claim 18, wherein each transaction received by the coherence point includes a quality of service (QoS) attribute, the switch fabric comprises a QoS aware arbiter, and the coherence point comprises a non-QoS-aware arbiter.

20. The SoC as recited in claim 19, wherein additional transactions are prevented from being sent to the coherence point by sending a stall signal to the switch fabric.

21. The SoC as recited in claim 18, wherein the coherence point further comprises level two (L2) duplicate tags, and wherein to determine whether outstanding transactions stored in the IRQ need to be serviced by the memory controller, the coherence point is configured to perform a lookup of the L2 duplicate tags for outstanding transactions stored in the IRQ.

22. The SoC as recited in claim 21, wherein to decrement the second count without removing the outstanding transaction from the IRQ, the coherence point is configured to decrement the second count responsive to detecting a hit in the L2 duplicate tags for the given transaction without removing the outstanding transaction from the IRQ.

* * * * *

UNITED STATES PATENT AND TRADEMARK OFFICE
CERTIFICATE OF CORRECTION

PATENT NO. : 9,524,261 B2  
APPLICATION NO. : 13/724955  
DATED : December 20, 2016  
INVENTOR(S) : Saund et al.

Page 1 of 1

It is certified that error appears in the above-identified patent and that said Letters Patent is hereby corrected as shown below:

In the Claims

Column 16, Claim 18, Line 32, please delete "compare the the" and insert -- compare the --.

Signed and Sealed this  
Eighteenth Day of April, 2017

Michelle K. Lee  
*Director of the United States Patent and Trademark Office*